(12) United States Patent
Odate et al.

(10) Patent No.: US 7,581,613 B2
(45) Date of Patent: Sep. 1, 2009

(54) SEAT BELT DEVICE

(75) Inventors: Shotaro Odate, Wako (JP); Hiroshi Akaba, Wako (JP); Yutaka Wakisaka, Wako (JP); Tsutomu Terasaki, Wako (JP); Osamu Kanno, Wako (JP); Kenichi Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 157 days.

(21) Appl. No.: 11/773,678

(22) Filed: Jul. 5, 2007

(65) Prior Publication Data
US 2008/0012282 A1 Jan. 17, 2008

(30) Foreign Application Priority Data
Jul. 11, 2006 (JP) .............................. 2006-190420

(51) Int. Cl.
B60R 22/00 (2006.01)
(52) U.S. Cl. ..................... 180/268; 280/806; 280/807; 280/808; 701/45
(58) Field of Classification Search ................ 280/806, 280/807, 808; 242/374; 180/268; 701/45
See application file for complete search history.

(56) References Cited

U.S. PATENT DOCUMENTS 4,261,224 A * 4/1981 Sulzer ........................... 475/2
6,910,653 B2 6/2005 Tanji
7,059,444 B2 * 6/2006 Kachu ........................ 180/268

FOREIGN PATENT DOCUMENTS

| EP | 1 323 599 | 7/2003 |
| JP | 2002-326558 | 11/2002 |
| JP | 2003-191819 | 7/2003 |
| WO | 2005/021339 | 3/2005 |

* cited by examiner

Primary Examiner—Ruth Ilan
Assistant Examiner—Keith J Frisby
(74) Attorney, Agent, or Firm—Rankin, Hill & Clark LLP

(57) ABSTRACT

The seat belt device includes a first unit, a second unit, seat belt webbing, a spindle, a first pretensioner, a second pretensioner, and a controller. The first unit determines a possible collision of an automobile in response to a manipulation of the automobile by a driver. The second unit detects the collision of the automobile. The first pretensioner has a motor to rotate in response to a signal indicative of the possible collision determined by the first unit. The second pretensioner is pyrotechnically driven to rotate in response to a signal indicative of the collision detected by the second unit. The controller is configured to cancel an operation of the first pretensioner after an activation of the second pretensioner. The first pretensioner includes a limiter for restricting the motor from transmitting a driving force to the spindle exceeding a predetermined threshold.

4 Claims, 10 Drawing Sheets

SEAT BELT DEVICE

This application is based on and claims the benefit of priority from Japanese Patent Application No. 2006-190420, filed on 11 Jul. 2006, the content of which is incorporated herein by reference.

BACKGROUND OF THE INVENTION

1. Field of the Invention

The invention relates to a seat belt device, and more particularly to a seat belt device which can tighten seat belt webbing in the event of an emergency.

2. Related Art

A seat belt device of an automobile has an Emergency Locking Retractor (ELR) which locks seat belt webbing so as not to be unwound from a retractor when an acceleration exceeding a predetermined threshold is exerted on the automobile. In addition, some retractors have a pretensioner and a load limiter.

The pretensioner described above can immediately wind the seat belt webbing at an earlier time of impact exerted on the automobile, restraining an occupant from moving forward. The load limiter has Energy Absorption (EA), absorbing the kinetic energy of the occupant due to his or her inertial movement with the seat belt webbing. Various kinds of seat belt devices have been proposed, which can control the pretensioner and the load limiter to decrease the restrictive feeling of the restrained occupant, while maintaining safety.

A seat belt device has been invented, which can control a conventional lock mechanism to work normally in the event a pyrotechnic pretensioner is activated (see Japanese Unexamined Patent Application Publication No. 2002-326558). Another seat belt device has been invented, which can stably control a load limiter when a pyrotechnic pretensioner operates (see Japanese Unexamined Patent Application Publication No. 2003-191819).

The seat belt devices disclosed in Japanese Unexamined Patent Application Publication Nos. 2002-326558 and 2003-191819 block the transmission of a rotation from a motor pretensioner to a spindle when a pyrotechnic pretensioner operates. However, these seat belt devices require a new mechanism including additional parts (a solenoid for example) and components in order to block the transmission of power from the motor. Furthermore, since it is necessary to place the mechanism in a vacant space adjacent to the existing motor and pyrotechnic pretensioners, the assembly of the seat belt device becomes complicated, which may result in increased cost. Therefore, it may be preferable that the seat belt device is compatible with the existing pretensioners.

In a conventional seat belt device of an automobile, for example, an occupant moving forward unwinds seat belt webbing after a pyrotechnic pretensioner has been activated. In other words, a spindle onto which the seat belt webbing is wound rotates in a direction to unwind the seat belt webbing. In contrast, when a motor pretensioner works after the pyrotechnic pretensioner has been activated, it may occur that the spindle rotates in a direction to wind the seat belt webbing. This is due to the fact that a clutch mechanism to restrict a reverse rotation of the motor may engage with the spindle while the motor is rotating in a direction to wind the seat belt webbing. If such a phenomenon occurs, the seat belt device can not perform appropriate Energy Absorption (EA). In addition, the seat belt device has a drawback that the load imposed on the motor pretensioner is excessive. The present invention has been provided to solve such a drawback.

SUMMARY OF THE INVENTION

The invention provides a seat belt device for automobiles. The seat belt device can implement appropriate Energy Absorption (EA) with a motor pretensioner having activation triggered by a manipulation of the automobile given by an occupant, and a pyrotechnic pretensioner activated at the time of a collision.

In an aspect of the present invention, the seat belt device includes a first unit, a second unit, seat belt webbing, a spindle, a first pretensioner, a second pretensioner, and a controller. The first unit determines a possible collision of an automobile in response to a manipulation of the automobile by a driver. The second unit detects the collision of the automobile. A portion of the seat belt webbing is wound around the spindle. The first pretensioner has a motor to rotate in a direction to wind the seat belt webbing onto the spindle in response to a signal indicative of the possible collision determined by the first unit. The second pretensioner is pyrotechnically driven to rotate in a direction to wind the seat belt webbing onto the spindle in response to a signal indicative of the collision detected by the second unit. The controller is configured to cancel an operation of the first pretensioner after an activation of the second pretensioner. The first pretensioner includes a limiter for restricting the motor from transmitting a driving force to the spindle exceeding a predetermined threshold, while resisting the spindle rotating in a direction to unwind the seat belt webbing.

The seat belt device described above includes the controller which cancels the operation of the first pretensioner after the activation of the second pretensioner. Therefore, the seat belt device can prevent the first pretensioner from interfering with EA operation while the seat belt device is performing EA operation after the activation of the second pretensioner. In addition, since the seat belt device can respond to a sudden manipulation of the automobile given by the occupant, as well as determining a possible collision, it increases robustness. Furthermore, the seat belt device according to the invention can safely protect the occupant without expensive components such as radar.

In another aspect of the invention, a seat belt device includes a first unit, a second unit, seat belt webbing, a spindle, a first pretensioner, a second pretensioner, a sensor, and a controller. The first unit determines a possible collision of an automobile in response to a manipulation of the automobile by a driver. The second unit detects the collision of the automobile. A portion of the seat belt webbing is wound around the spindle. The first pretensioner has a motor to rotate in a direction to wind the seat belt webbing onto the spindle in response to a signal indicative of the possible collision determined by the first unit. The second pretensioner is pyrotechnically driven to rotate in a direction to wind the seat belt webbing onto the spindle in response to a signal indicative of the collision detected by the second unit. The sensor is attached to the automobile. The controller is configured to activate the first pretensioner immediately before the second pretensioner starts operating, according to at least one of a signal indicative of an activation of the second unit and a signal generated by the sensor. The first pretensioner includes a limiter for restricting the motor from transmitting a driving force to the spindle exceeding a predetermined threshold, while resisting the spindle rotating in a direction to unwind the seat belt webbing.

The seat belt device described above activates the first pretensioner before the second pretensioner when the automobile encounters the collision without the prediction of the possible collision. In this way, the seat belt device can always prevent the sequence of activation from being reversed. This means that the seat belt device can control a retractor which requires a particular sequence of activation.

In still another aspect of the invention, the seat belt device is provided, in which the limiter includes an intermediate gear of a train of gears to transmit a rotation from the motor to the spindle. The intermediate gear includes a first gear, a second gear, and at least one elastic member. The motor transmits a rotation to the first gear. The second gear is coaxially and rotatably coupled with the first gear, transmitting the rotation to the spindle. The elastic member frictionally couples the first and second gears with a predetermined frictional force.

The seat belt device described above assigns the intermediate gear installed in the first pretensioner to the limiter which includes the first and second gears and at least one elastic member. In this way, the seat belt device can use a conventional first pretensioner without a new mechanism. Accordingly, the seat belt device can provide the first pretensioner having the motor to drive the seat belt webbing in a simple configuration for assembly, which allows the problems of high cost to be eliminated.

DETAILED DESCRIPTION OF THE INVENTION

An embodiment of the invention is now described with reference to the drawings.

Figure 1:
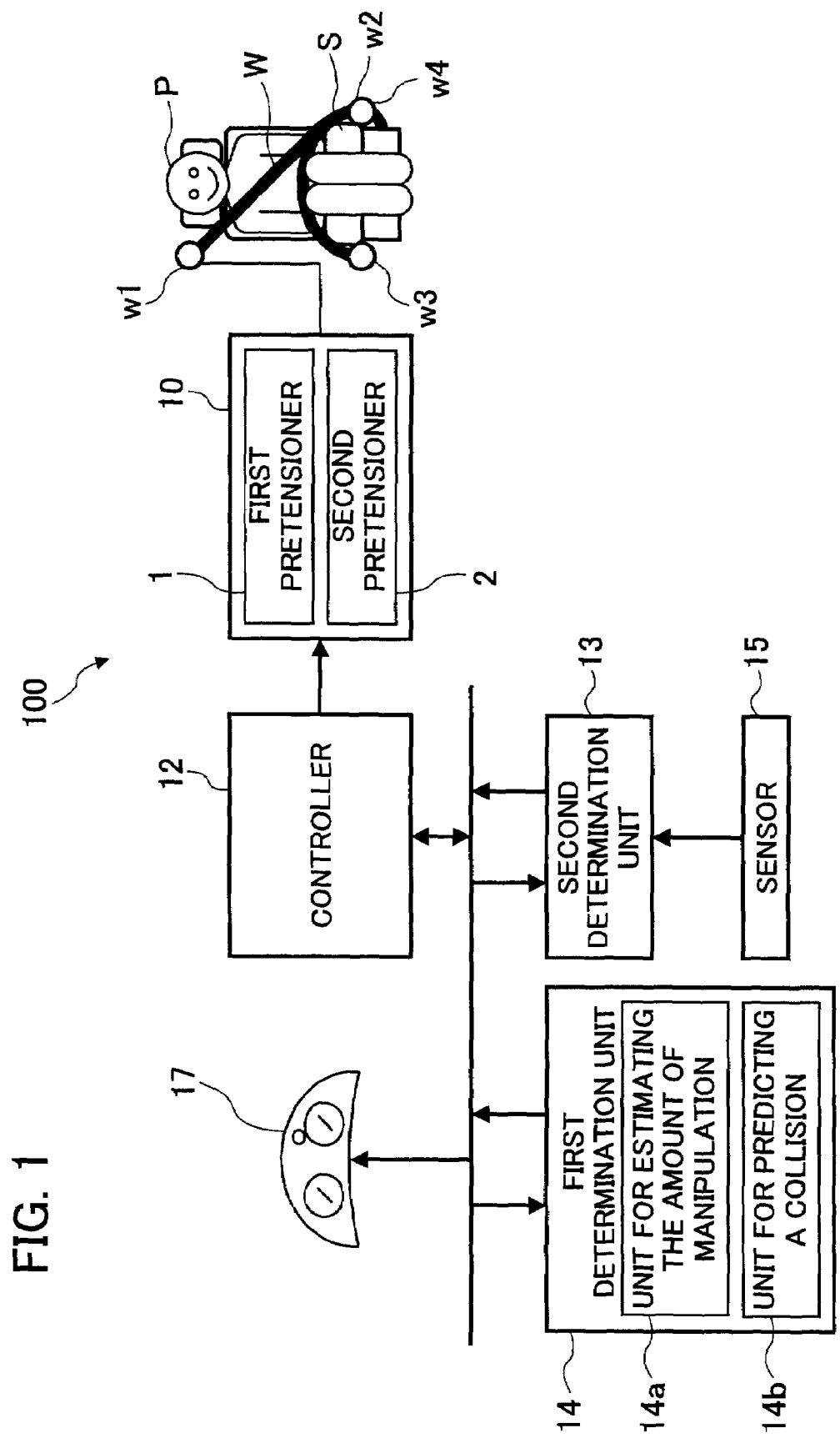
FIG. 1 is a block diagram showing a seat belt device according to an embodiment of the invention.

First, a description is given of the overall setup of a seat belt device. As shown in FIG. 1, a seat belt device 100 includes seat belt webbing W and a retractor 10. The seat belt webbing W is prepared for an occupant P seated in a seat S. The retractor 10 applies a certain tension to the seat belt webbing W so as to restrain the occupant P.

Figure 2:
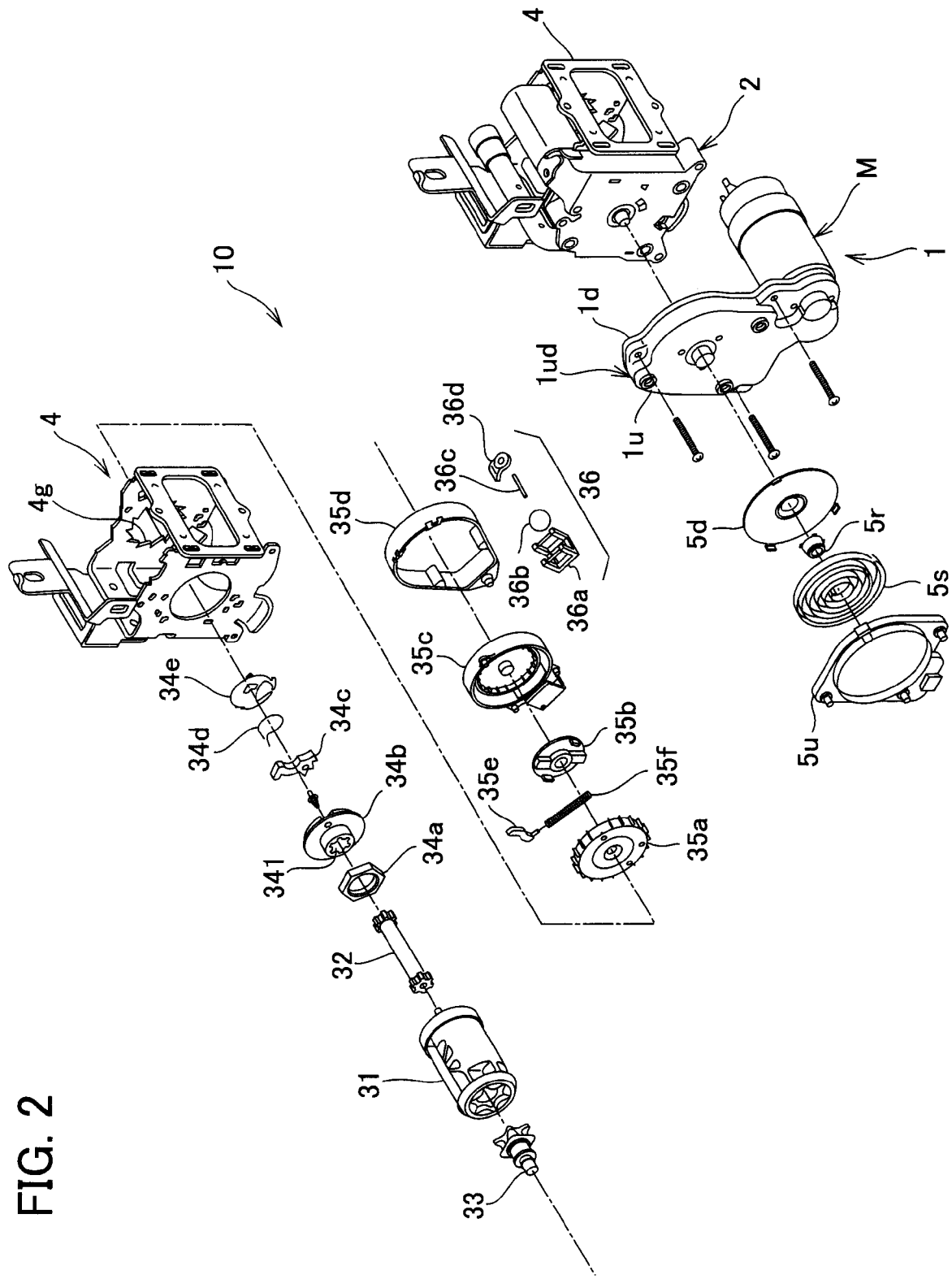
FIG. 2 is an exploded perspective view showing a retractor of the seat belt device according to the embodiment.

As shown in FIG. 1, one end portion of the seat belt webbing W is wound around a spindle 31 (see FIG. 2). The seat belt webbing W extending from the retractor 10 is folded back at a shoulder anchor w1, which is placed at an upper portion of a center pillar adjacent to the shoulder of the occupant P. The seat belt webbing W extending from the shoulder anchor w1 is inserted through a tongue plate w2. The other end portion of the seat belt webbing W is secured to an anchor w3 at a lower portion of the center pillar. A buckle w4 is placed adjacent to the hip of the occupant P in the seat S. When the occupant P wears the seat belt webbing W, the tongue plate w2 is connected with the buckle w4.

As shown in FIG. 2, the retractor 10 includes a first pretensioner 1 having a motor M which can rotate the spindle 31 in directions to wind and unwind the seat belt webbing W. A controller 12 shown in FIG. 1 is communicatively connected with a first determination unit 14, a second determination unit 13, a displaying unit and the like, via an onboard LAN.

In FIG. 1, the second determination unit 13 (e.g. an SRS unit) transmits a trigger signal to activate the second pretensioner 2 attached to the retractor 10 in response to a detection signal sent from a sensor 15.

In FIG. 1, the first determination unit 14 (e.g. a VSA unit) outputs a signal indicating a possible collision based on a received signal associated with an amount of manipulation (e.g. braking and sudden steering). The first determination unit 14 includes a unit 14a for estimating the amount of manipulation. The controller 12 transmits a trigger signal to activate the motor M attached to the first pretensioner 1 in response to the signal indicating the possible collision (see FIG. 2).

In FIG. 1, a unit 14b for predicting a collision, which is installed in the first determination unit 14, is used, for example, in an automobile having a unit to detect a distance relative to a forerunning automobile and a relative velocity with millimeter-wavelength radar. When the unit 14b determines the possibility of a collision, it transmits a signal to the displaying unit 17 so as to audibly and visually call a driver's attention by an alarm.

As shown in FIG. 2, the retractor 10 includes the spindle 31 around which one end portion of the seat belt webbing W is wound, and a torsion bar 32 assembled into the spindle 31. The first pretensioner 1 transmits a rotational force driven by the motor M to the spindle 31 via a mechanical transmission. The first pretensioner 1 includes a clutch mechanism which connects and disconnects the transmission of power to the spindle 31 according to the rotational direction of the motor M. The controller 12 controls the rotation of the motor M in normal and reversal directions (see FIG. 1).

As shown in FIG. 1, the first determination unit 14 which determines the possibility of a collision for an automobile is electrically connected with a plurality of sensors. If the first determination unit 14 determines the possibility of a collision, the motor M attached to the first pretensioner 1 rotates the spindle 31, around which the one end portion of the seat belt webbing W is wound, in a direction to wind the seat belt webbing W.

As shown in FIG. 2, the retractor 10 includes the second pretensioner 2. The second pretensioner 2 pyrotechnically drives the rotation of the spindle 31 in a direction to wind the seat belt webbing W upon a collision of the automobile. The second pretensioner 2 includes a mechanism which transforms a pyrotechnic force into a rotational force, transmitting this rotational force to the spindle 31. The second pretensioner 2, which is normally uncoupled from the spindle 31, rotates the spindle 31 by an explosion of gunpowder in response to the detection of a collision of the automobile by the second determination unit 13.

As shown in FIG. 2, the first pretensioner 1 and the second pretensioner 2 are attached to one side of a box-shaped base frame 4. An upper spring cover 5u and a lower spring cover 5d in a pair are attached to one side of the first pretensioner 1. A helical spring 5s is placed between the upper and lower spring covers 5u and 5d. The end of the outer circumference of the helical spring 5s is secured to the upper spring cover 5u. On the other hand, the central end of the helical spring 5s is secured to a retainer 5r. The retainer 5r is rotatably coupled with the central shaft of a ratchet gear 1t of the first pretensioner 1 to be described later (see FIG. 3). In addition, the central shaft of the ratchet gear 1t is attachably, detachably and rotatably coupled with a sleeve 33, which is provided axially at one end of the spindle 31. Since the ratchet gear 1t is freely rotatable normally (time of non-operation), the helical spring 5s can urge a rotational force to the spindle 31 in a direction to wind the seat belt webbing W.

As shown in FIG. 2, a fitting recess (not shown) is formed inside the spindle 31. One end portion of the torsion bar 32 is fitted in the fitting recess. The other end portion of the torsion bar 32 is fitted in a fitting recess 341 formed on one side of a tread head 34b. One side of the tread head 34b is rotatably coupled with the spindle 31 using an EA stopper 34a. In a recess formed on the other side of the tread head 34b, a locking element 34c is retained. The orientation of the locking element 34c is restricted by an omega spring 34d having a shape of an omega symbol. The locking element 34c and the omega spring 34d are hermetically retained by a safety plate 34e. The safety plate 34e is stacked with a steering wheel 35a, an internally connecting member 35b and a bearing plate 35c. The bearing plate 35c is covered by a cover 35d.

Since both ends of the spindle 31 described above are supported by the upper spring cover 5u and the bearing plate 35c, it can wind the seat belt webbing W by the force urged by the helical spring 5s. In addition, the force urged by the helical spring 5s applies a slight amount of tension to the seat belt webbing W. The spindle 31 having the components described above is installed inside the box-shaped base frame 4 (see FIG. 2).

In FIG. 2, an engaging claw of the locking element 34c stored in the tread head 34b is so arranged as to swing outwardly in response to a sudden force to unwind the seat belt webbing W. The outwardly swung engaging claw engages with one of internal teeth 4g formed in the base frame 4. In this way, the engaging claw and the internal teeth 4g serve as a locking mechanism 36 which prevents the tread head 34b from rotating. More specifically, the acceleration of an automobile exceeding a predetermined threshold causes a ball 36b to shift. Accordingly, the engaging claw swings outwardly to engage with one of the teeth 4g. This renders the lock mechanism 36 in a locked position. Accordingly, the rotation of the torsion bar 32 comes to rest, and the rotation of the spindle 31 is restricted to that permitted by the amount of torsion provided by the torsion bar 32. The seat belt webbing W is wound up while receiving a tension generated by the torsion of the torsion bar 32. In this way, the seat belt device can provide Energy Absorption (EA).

In this connection, a lever 35e and a WS spring 35f, as shown in FIG. 2, are components which connect and disconnect the steering wheel 35a from the bearing plate 35c while interlocking with the internally connecting member 35b. It should be noted that FIG. 2 does not depict all the items, but to the extent necessary to allow a person having ordinary skill in the art understand the aforementioned mechanism.

A description is given of the setup and function for the first pretensioner 1.

As shown in FIG. 2, the first pretensioner 1 includes an upper gear case 1u and a lower gear case 1d. These upper and lower gear cases 1u and 1d are assembled as a gear case 1ud. The gear case 1ud is attached to one side of the base frame 4.

Inside the gear case 1ud are installed components to be described later. The motor M is secured to the gear case 1ud facing the lower gear case 1d.

Figure 3:
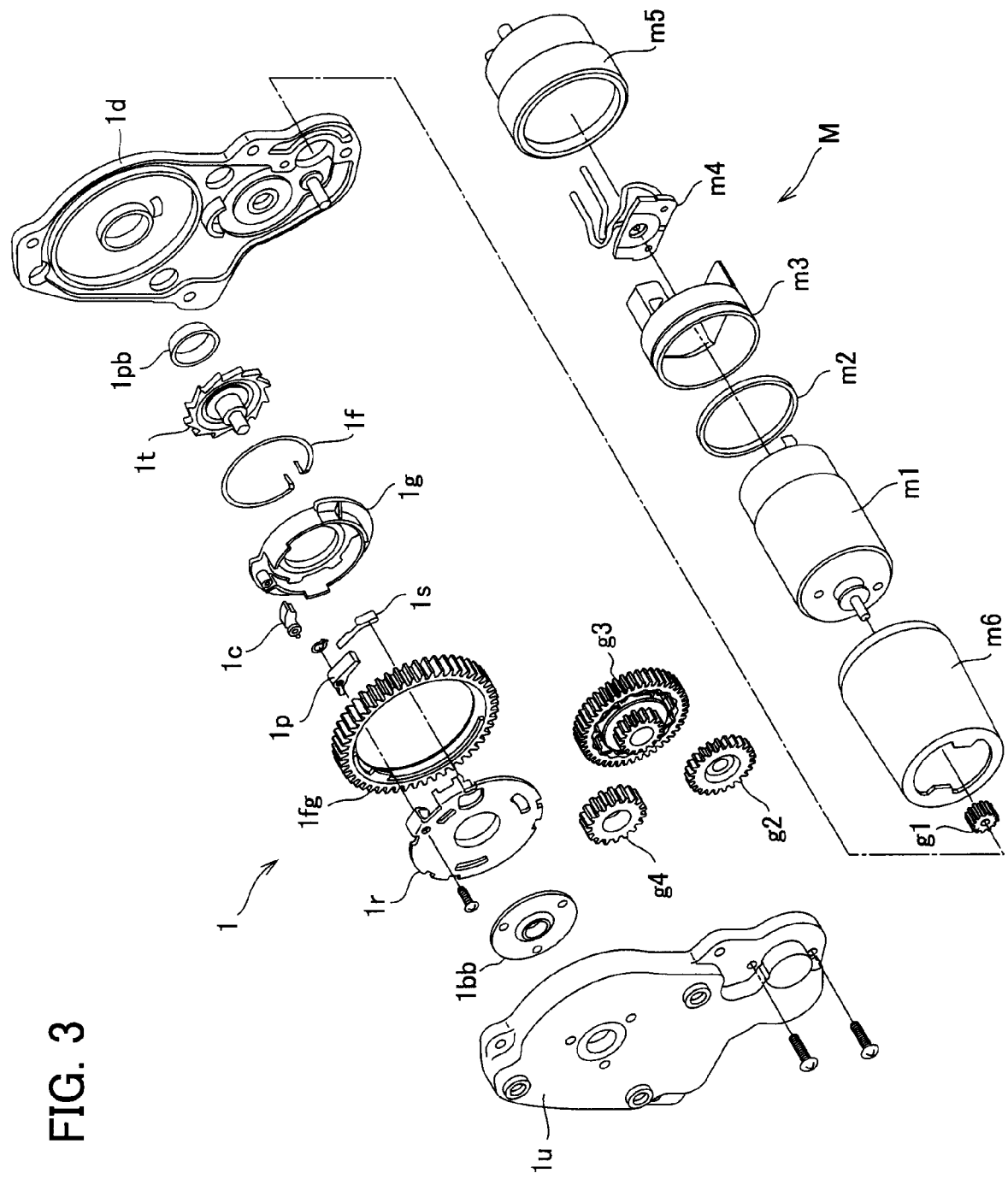
FIG. 3 is an exploded perspective view showing a first pretensioner of the seat belt device according to the embodiment.

As shown in FIG. 3, an initial gear g1 is attached to the rotational shaft of the motor M, which includes motor components m1 to m6. The initial gear g1 is coupled with a final gear 1fg via intermediate gears g2 to g4. The motor M and the final gear 1fg are coupled with each other via a gear train functioning as a reduction gear mechanism including the intermediate gears g2 to g4. Of these intermediate gears g2 to g4, the intermediate gear g3 serves as a mechanism to prevent the transmission of driving power from the motor M to the spindle 31 from exceeding a predetermined threshold.

Figure 8A:
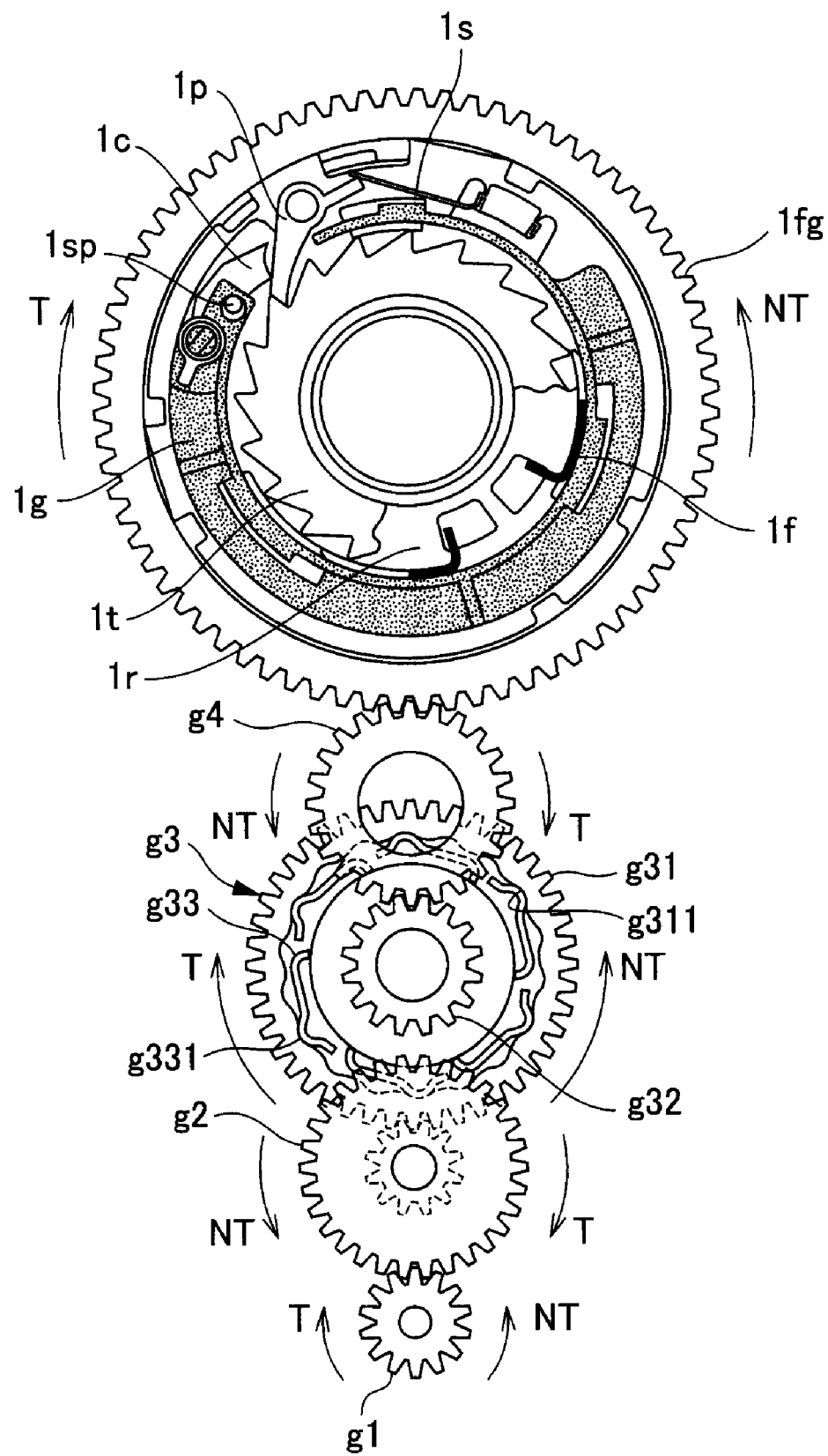
FIG. 8A is a front view showing a gear train installed in the first pretensioner according to the embodiment.
Figure 8B:
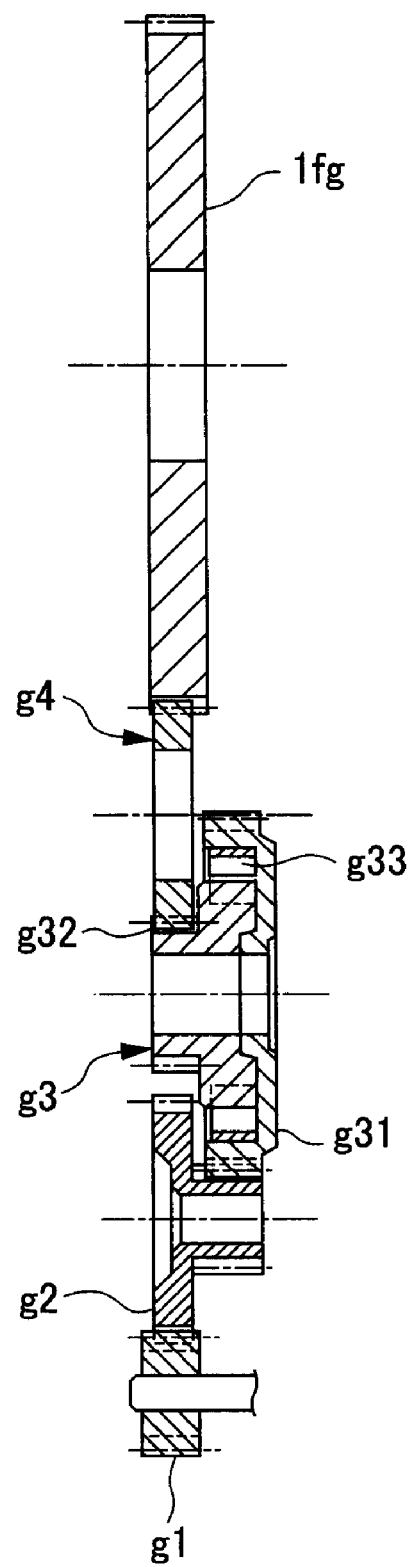
FIG. 8B is a sectional view of FIG. 8A.

As show in FIG. 8, the intermediate gear g3 described above includes a first gear g31, a second gear g32 and a plurality of elastic members g33. The first gear g31 engages with the intermediate gear g2 such that the motor M transmits the rotation to the first gear g31. The second gear g32 engages with the intermediate gear g4 to transmit the rotation to the spindle 31 (see FIG. 2). The second gear g32 is coupled coaxially with the first gear g31. The first and second gears g31 and g32 are coupled with each other to enable rotation relative to each other in a radial direction, and not change in relative position in a thrust direction.

As shown in FIG. 8, the elastic member g33 may be a blade spring in this embodiment. One end portion of the elastic member g33 is secured to a toothless shaft portion of the second gear g32, and the other end portion is in pressure contact with the inner peripheral portion of the first gear g31 enclosing the shaft portion. It may be alternatively possible that one end portion of the elastic member g33 is secured to the inner peripheral portion of the first gear g31, and the other end portion is in pressure contact with the toothless shaft. In this way, a plurality of elastic members g33 provides coupling between the first gear g31 and the second gear g32 with a predetermined frictional force. More specifically, an arc-shaped convex portion g331 is in pressure contact with an arc-shaped concave portion g311 which is formed on the inner circumference of the first gear g31. If a rotational force exceeding the frictional force between arc-shaped convex portions g331 and arc-shaped concave portions g311 is exerted on a pair of the first and second gears g31 and g32, the arc-shaped convex portions g331 shift from the arc-shaped concave portions g311. In this way, the restriction on the transmission of a force greater than a predetermined threshold is imposed. In FIG. 8, the six elastic members g33 are arranged at regular intervals, for example. It may be alternatively possible that one or more elastic members g33 are arranged and the number of elastic members g33 is determined in view of spatial restrictions.

Figure 9:
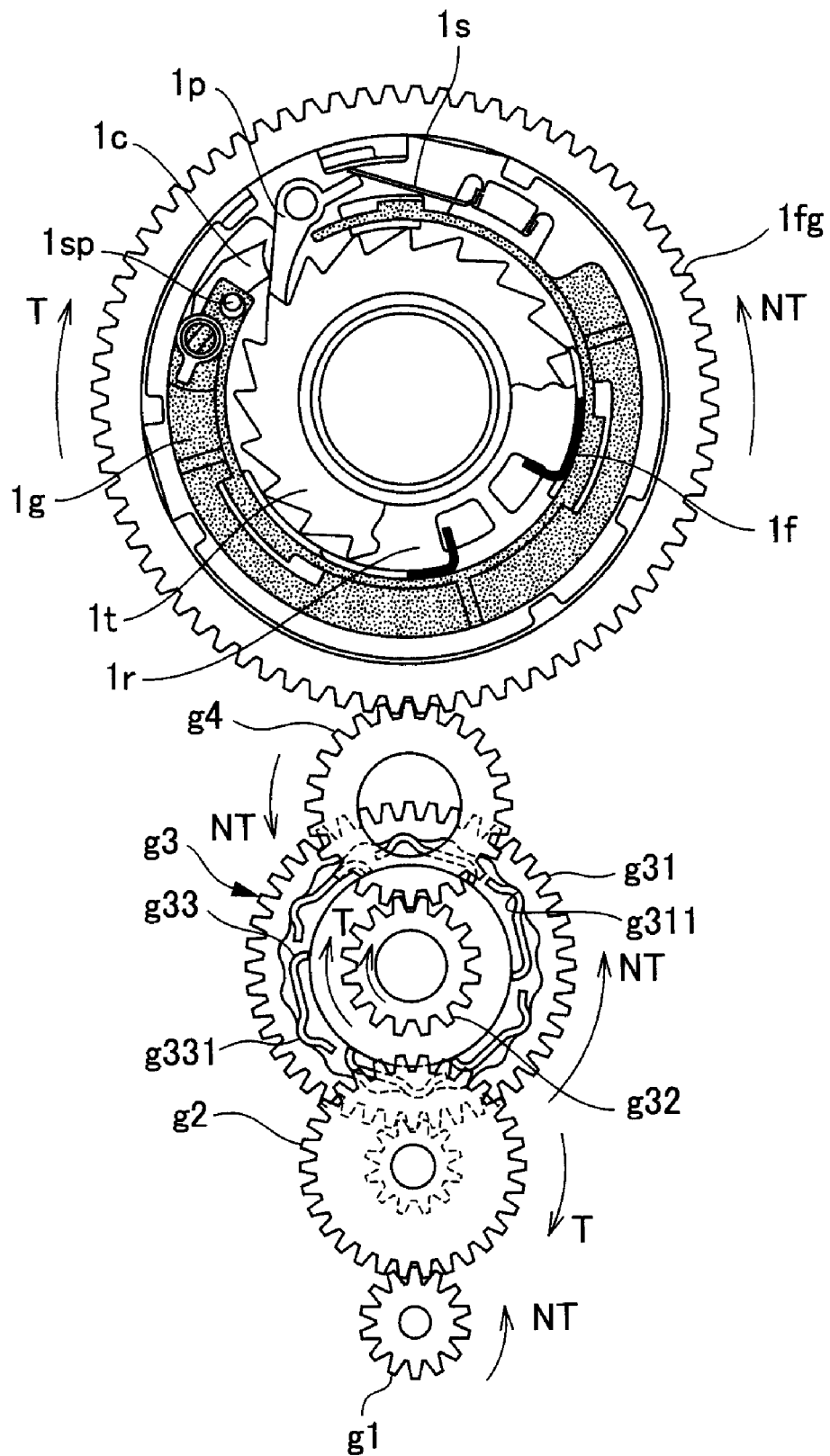
FIG. 9 is a front view showing the gear train for the case where a limiter of intermediate gears is in operation.

In FIG. 8 and FIG. 9, the initial gear g1, the intermediate gears g2 to g4, and the final gear 1fg are arranged such that their axial centers are aligned in a straight line. It may be alternatively possible that the centers of the intermediate gears g2 to g4 are arranged such that each center is positioned at an apex of a triangle. Similarly, it may be possible that the centers of the intermediate gears g3 and g4, and the final gear 1fg are positioned such that each center is at an apex of a triangle so as to implement a spatially compact packaging.

In FIG. 8, symbols T and NT represent a clockwise direction and a counterclockwise direction of rotation, respectively. During the normal operation of the first pretensioner 1, when the initial gear g1 rotates in a counterclockwise direction NT, the rotation is transmitted to the final gear 1fg via the intermediate gears g2 to g4, so that the final gear 1fg rotates in a counterclockwise direction NT. In this way, the final gear 1fg can rotate the spindle 31 in a direction to wind the seat belt webbing W (see FIG. 1 and FIG. 2). When the initial gear g1 rotates in a clockwise direction T, the rotation is transmitted to the final gear 1fg via the intermediate gears g2 to g4, so that the final gear 1fg rotates in a clockwise direction T. Subsequently, a mechanism to be described later decouples the connection between the final gear 1fg and a guide ring 1g. In this way, the mechanical transmission between the spindle 31 and the motor M can be stopped (see FIG. 2).

Figure 4:
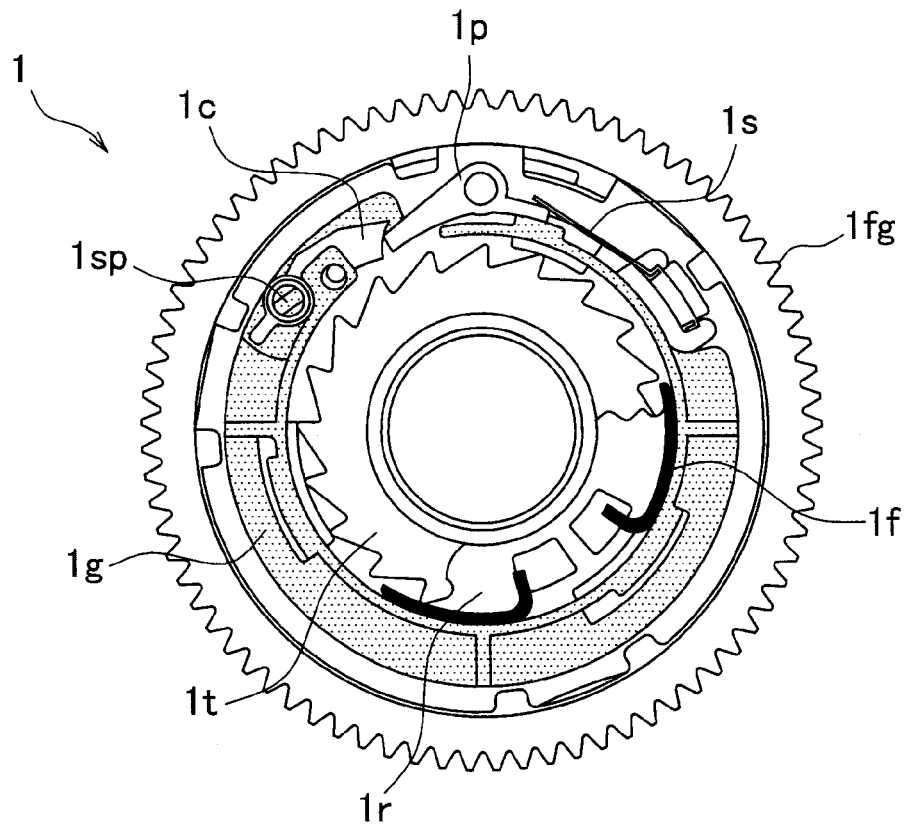
FIG. 4 is an enlarged sectional view showing the main portion of the first pretensioner in a normal state according to the embodiment.

As shown in FIG. 3 and FIG. 4, the final gear 1fg has a ring shape. A ring plate 1r is attached to the final gear 1fg such that the ring plate 1r serves as a bottom plate for the final gear 1fg. In addition, an omega-shaped friction spring 1f is attached to the ring plate 1r. The guide ring 1g is supported between the external periphery of the friction spring 1f and the inner periphery of the final gear 1fg. The guide ring 1g is positioned coaxially with the final gear 1fg. The guide ring 1g is retained such that the guide ring 1g can rotate relative to the final gear 1fg, but cannot change relative position in a thrust direction. Steps are provided on the inner periphery of the final gear 1fg and the external periphery of the guide ring 1g. These steps are in contact with each other, so as to adjust the rotational angle of the guide ring 1g with respect to the final gear 1fg.

As shown in FIG. 4, the friction spring 1f is attached to the ring plate 1r in a manner such that the friction spring 1f outwardly expands so as to urge an elastic force to the inner periphery of the guide ring 1g. Since the guide ring 1g is in sliding contact with the inner periphery of the final gear 1fg, the rotation of the guide ring 1g follows the rotation of the final gear 1fg with a time delay. When the guide ring 1g rotates a predetermined angle α, the final gear 1fg and the guide ring 1g start rotating in unison (see FIG. 5). When the final gear 1fg rotates in the opposite direction, the guide ring 1g, which is in sliding contact with the inner periphery of the final gear 1fg, rotates with a time delay following the final gear 1fg (se FIG. 6). When the guide ring 1g rotates a predetermined angle β, the final gear 1fg and the guide ring 1g are decoupled (see FIG. 6).

Figure 5:
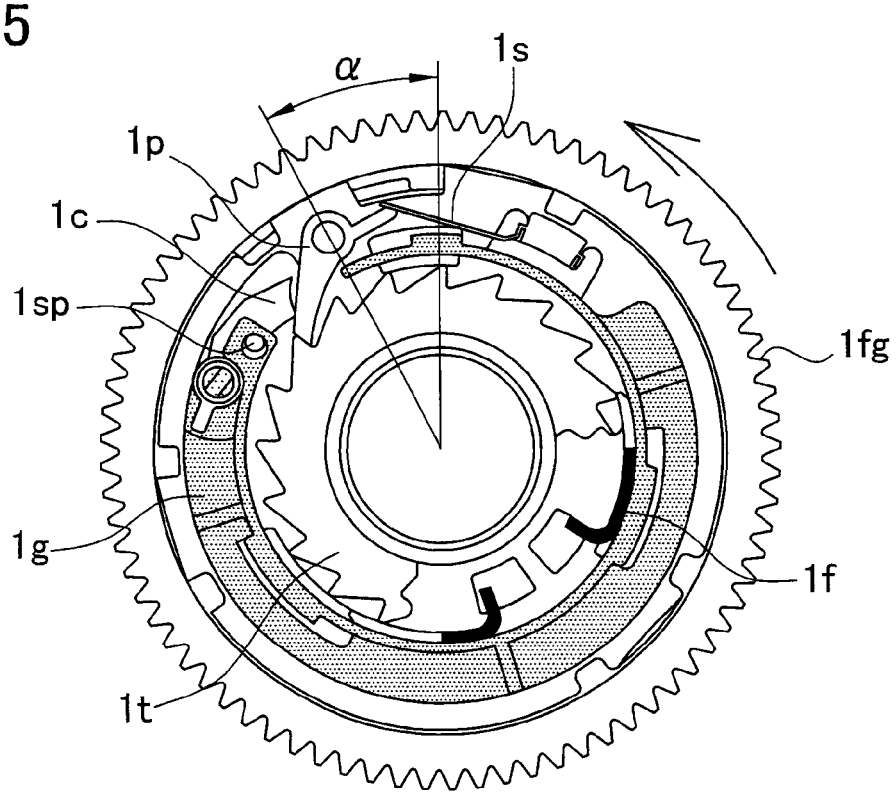
FIG. 5 is an enlarged sectional view showing the main portion of the first pretensioner according to the embodiment, when gears move relative to the state shown in FIG. 4.

As shown in FIG. 4 and FIG. 5, the ratchet gear 1t is surrounded by the guide ring 1g. A return spring 1s (a blade spring) is provided at one end portion of a pawl 1p. The return spring is urges a force on the pawl 1p such that a tip of the pawl 1p moves away from the ratchet gear 1t. When the final gear 1fg rotates in a direction, the pawl 1p and a cam 1c approach each other such that one end portion of the cam 1c guides the tip of the pawl 1p towards the ratchet gear 1t (see FIG. 4). Subsequently, the tip of the pawl 1p engages with the ratchet gear 1t, so that the ratchet gear 1t rotates in the same direction as that of the final gear 1fg. In other words, the spindle 31 rotates in a direction to wind the seat belt webbing W (see FIG. 5).

Figure 6:
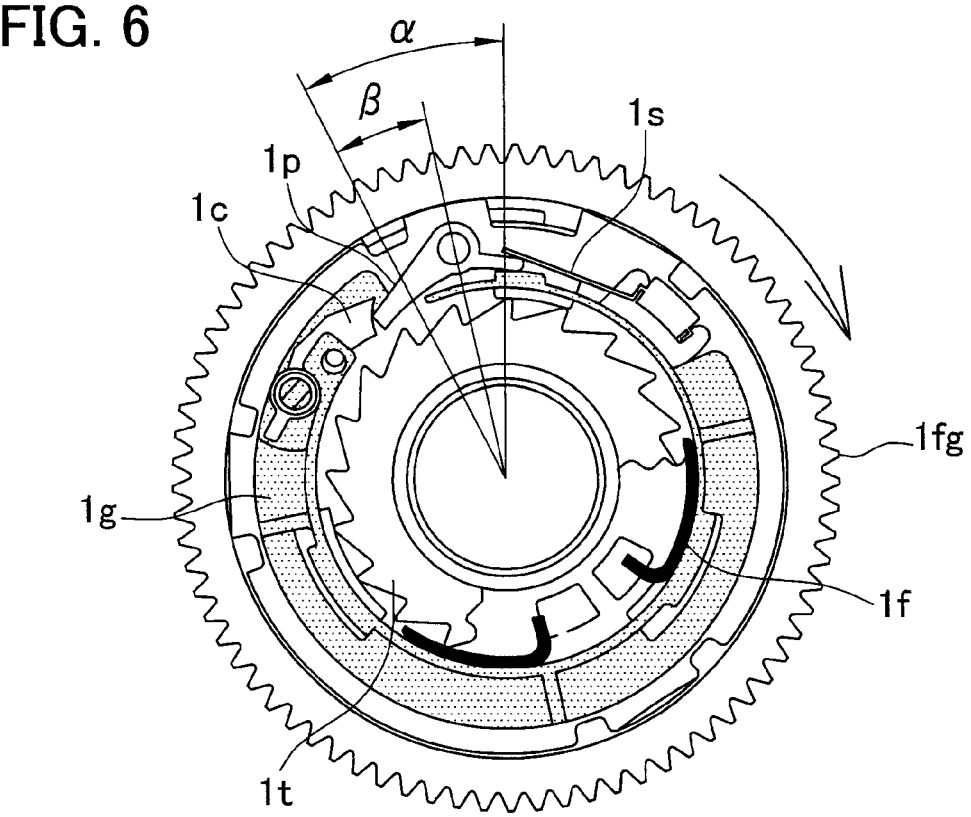
FIG. 6 is an enlarged sectional view showing the main portion of the first pretensioner according to the embodiment, when the gears move relative to the state shown in FIG. 5.

As shown in FIG. 6, when the final gear 1fg rotates in the opposite direction, the pawl 1p and the cam 1c separate from each other, and the end portion of the cam 1c guides the tip of the pawl 1p so as to disengage from the ratchet gear 1t. As a result of the disengagement of the tip of the pawl 1p from the ratchet gear 1t, the ratchet gear 1t and the final gear 1fg are decoupled.

Figure 7:
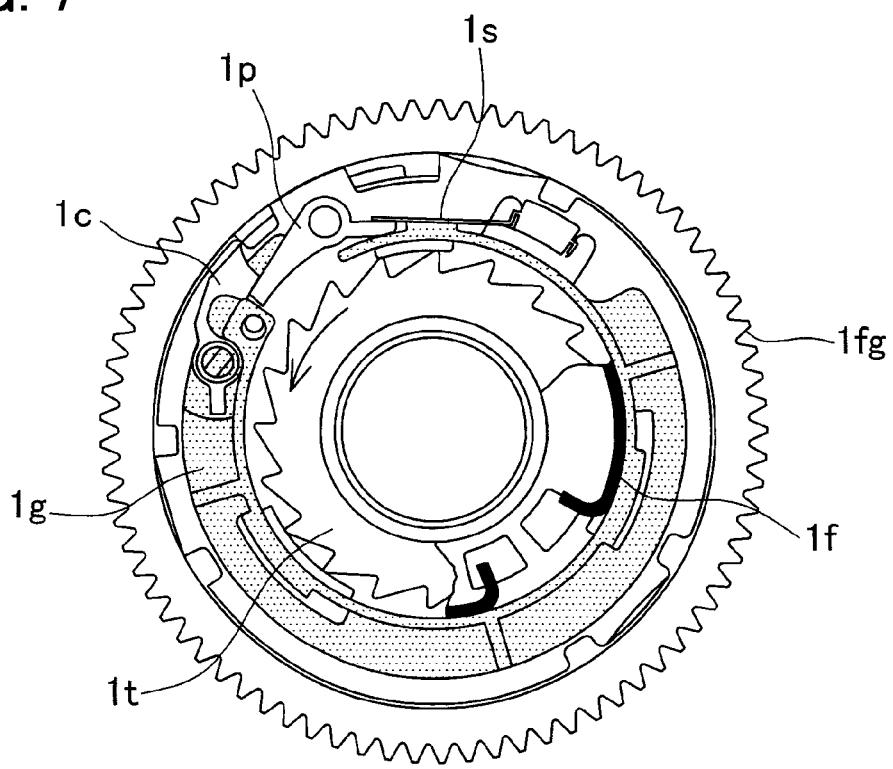
FIG. 7 is an enlarged sectional view showing the main portion of the first pretensioner according to the embodiment, when the gears move relative to the state shown in FIG. 5.

In FIG. 4, the middle portion of the cam 1c is retained by the guide ring 1g and a pin 1sp. The pin 1sp is normally rotatable with the guide ring 1g. However as shown in FIG. 5, when the ratchet gear it rotates faster than the final gear 1fg while the tip of the pawl 1p engages with the ratchet gear 1t, namely the second pretensioner 2 is activated, the cam 1c is flipped in synchronization with the pawl 1p being flipped by the ratchet gear it. Since the pin 1sp is broken accordingly, the cam 1c shifts (see FIG. 7). In this way, as the final gear 1fg is decoupled from the spindle 31, the final gear 1fg continues to rotate idly unless the motor M comes to rest.

As described above, the first pretensioner 1 has an instantaneous decoupling mechanism. If the second pretensioner 2 comes into operation while the first pretensioner 1 is in operation, this mechanism can release the coupling between the first pretensioner 1 and the spindle 31 by the rotational movement of the second pretensioner 2.

The seat belt device according to the invention is based on the premise that the first pretensioner 1 is activated at the time of determining a possible collision, and the second pretensioner 2 is activated at the time of detection of the collision. When the second pretensioner 2 comes into operation while the first pretensioner 1 is in operation, the instantaneous decoupling mechanism decouples the first pretensioner 1 from the spindle 31 by way of the rotation of the second pretensioner 2. In such a situation, the first pretensioner 1 to which the rotation of the motor M is not transmitted comes to rotate idly, so that the first pretensioner 1 does not affect the spindle 31 (see FIG. 2 and FIG. 7).

In contrast, when an automobile experiences a collision without the determination of a possible collision, a collision with an automobile from behind for example, the second pretensioner 2 comes into operation in response to an input sent from the sensor 15, without the first pretensioner 1 coming into operation. If a driver depresses the brake pedal immediately after the rear collision with the automobile, the first pretensioner 1 comes into operation, because the first determination unit 14 determines that the criterion has been met. Suppose that the pyrotechnic pretensioner has finished the operation and the seat belt webbing W is being unwound due to the movement of the occupant. The first pretensioner 1 tries to rotate the spindle 31 in the opposite direction to wind the seat belt webbing W, although the spindle 31 is rotating in a direction to unwind the seat belt webbing W in EA operation. In this way, the pretensioner 1 interferes with the EA operation.

Figure 10:
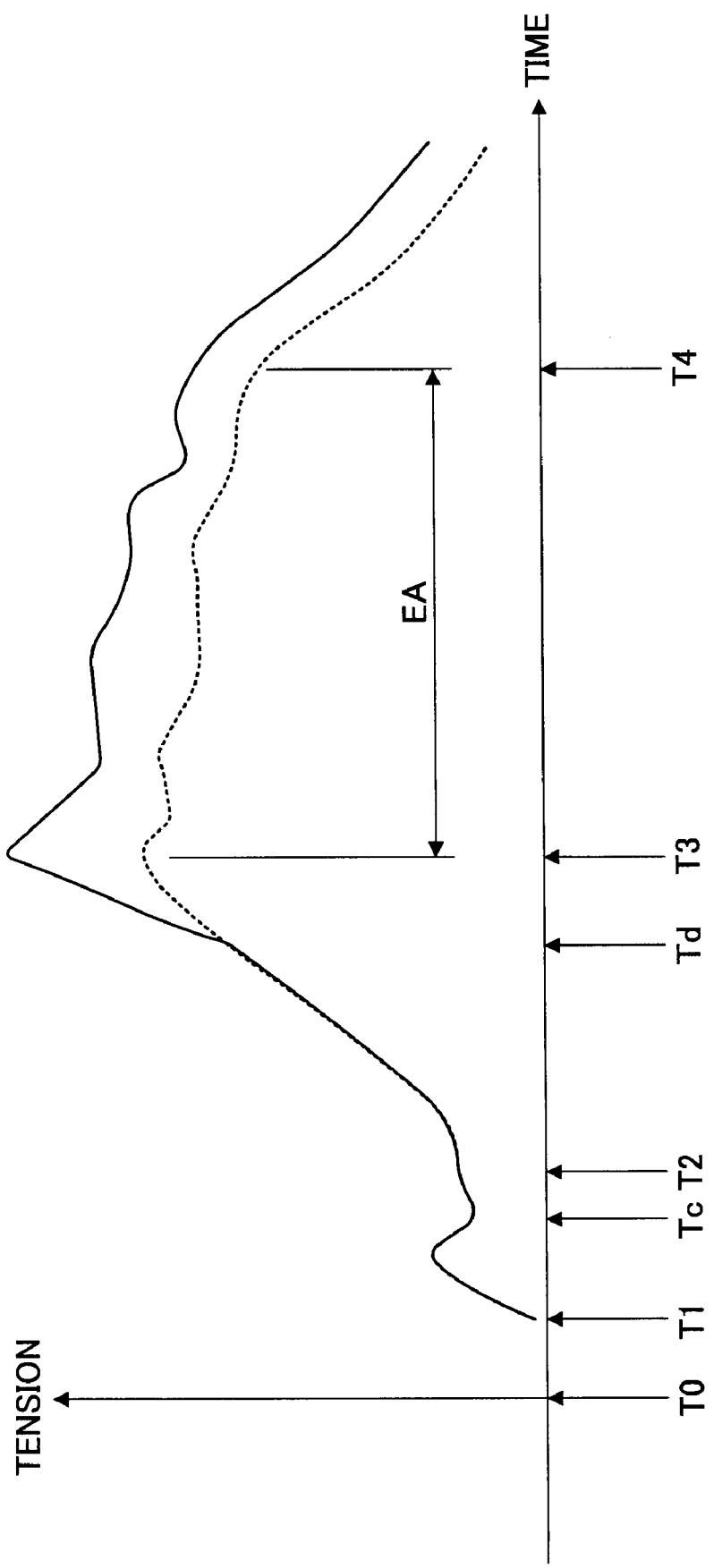
FIG. 10 is a graph showing the tension of seat belt webbing and elapsed time.

FIG. 10 is a graph showing the relationship between the tension of the seat belt webbing W and the elapse of time. A solid line represents the relationship for the case where the first pretensioner 1 comes into operation subsequent to the second pretensioner 2. A dotted line represents the relationship for the case of independent operation of the second pretensioner 2 (corresponding to a conventional pyrotechnic pretensioner).

First, a description is given of the case in FIG. 10 where only the second pretensioner 2 comes into operation. When a collision occurs at a time T0, the second determination unit 13 detects the collision according to a signal from the sensor 15, activating the second pretensioner 2 at a time T1. The tension of the seat belt webbing W starts rising at a time T2 when the occupant starts moving forward, and it reaches the maximum at a time T3 when he or she has finished moving forward. From time T3 to T4, the seat belt device performs moderate energy absorption, i.e. EA operation, followed by restoring the tension of the seat belt webbing W to the normal state over time. In this way, the second pretensioner 2 can implement efficient EA operation unless the first pretensioner 1 comes into operation.

Next, a description is given of the case in FIG. 10 where the first pretensioner 1 comes into operation subsequent to the second pretensioner 2. When a collision occurs at the time T0, the second determination unit 13 detects the collision according to a signal from the sensor 15, activating the second pretensioner 2 at the time T1. If an amount of manipulation of the brake exceeds a predetermined threshold at a time Tc, the first determination unit 14 determines a possible collision, sending a trigger signal to the controller 12 so as to activate the first pretensioner 1 at a time Td. Since the seat belt webbing W is unwound due to the forward movement of the occupant, the activated motor M prevents the spindle 31 from rotating in a direction to unwind the seat belt webbing W. In this way, the maximum tension occurring at the time T3 becomes greater than that represented by the dotted tension-time curve. This indicates that a conventional seat belt device interferes with EA operation.

The seat belt device according to the invention improves the adverse effect described above. More specifically, the controller 12 cancels a signal for activating the motor M of the first pretensioner 1 for the case where the second pretensioner 2 comes into operation without the first pretensioner 1 coming into operation. In other words, the controller 12 restricts the first pretensioner 1 from coming into operation after the second pretensioner 2 has been activated.

Figure 11:
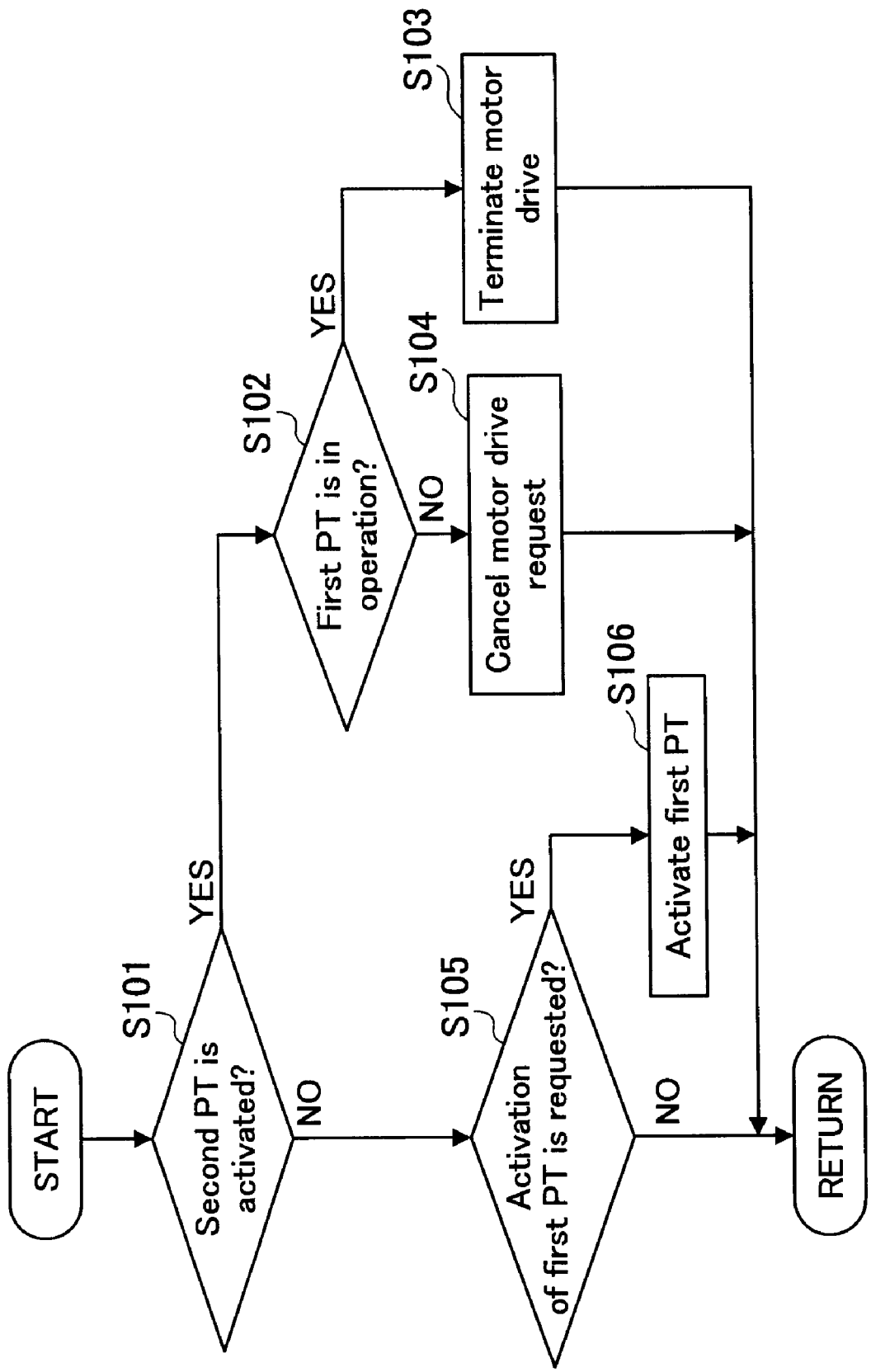
FIG. 11 is a system flow chart showing the operation of the seat belt device according to the embodiment.

FIG. 11 is a flow chart showing a process for the seat belt device according to the present invention. In FIG. 11, first PT and second PT represent the first and second pretensioners 1 and 2, respectively. First, the controller 12 determines whether or not the second pretensioner 2 is in operation (step S101). If the determination is affirmative in step S101, the controller 12 moves the process to step S102. In step S102, the controller 12 determines whether or not the first pretensioner 1 is in operation. If the determination in step S102 is affirmative, the controller 12 terminates driving of the motor M (step S103). And the controller 12 moves the process to the initial state.

If the determination in step S102 is negative, the controller 12 rejects an instruction for activating the motor M (step S104). In other words, the controller 12 is configured so as not to send a signal for activating the motor M even if the controller 12 receives an instruction for rotating the motor M of the first pretensioner 1. Subsequently, the controller 12 moves the process back to the initial state. If the second pretensioner 2 is not in operation in step S102, the controller 12 moves the process to step S105. In step S105, the controller 12 determines whether or not the operation of the first pretensioner 1 is requested. If the determination is affirmative in step S105, the controller 12 activates the first pretensioner 1 (step S106). Subsequently, the controller 12 moves the process to the initial state. If the determination is negative in step S105, the controller 12 moves the process to the initial state.

As described above, the seat belt device according to the invention can eliminate the causes of the seat belt device inherently interfering with EA operation, without changing the setup of the retractor. Therefore, even if the automobile experiences a collision without the determination of a possible collision, the seat belt device can appropriately restrain the occupant. In addition, since the seat belt device can respond to a sudden manipulation of the automobile given by the occupant, as well as determining a possible collision, it increases robustness. Furthermore, the seat belt device according to the invention can safely protect the occupant without expensive components such as radar.

It may be preferable, but is not necessary, that the first pretensioner 1 comes into operation prior to the second pretensioner 2. If the seat belt device operates in this sequence, the first pretensioner 1, which rotates idly without the transmission of rotation from the motor M, does not affect the spindle 31. This means that the seat belt device can implement efficient EA operation.

Therefore, one exemplary controller of the seat belt device according to the invention activates the first pretensioner 1 immediately prior to the second pretensioner 2 in response to a signal sent from at least one of the second determination unit and the sensor attached to the automobile.

More specifically, the first determination unit activates the first pretensioner at the time of detecting one property (acceleration for example) equal to a predetermined threshold. Subsequently, the second determination unit activates the second pretensioner at the time of detecting the property exceeding the predetermined threshold. It is alternatively possible that the second determination unit first forcibly activates the first pretensioner at the time of detecting the property equal to the predetermined threshold, followed by activating the second pretensioner. The seat belt device configured as described above, in which the first pretensioner is in operation at the time of the second pretensioner coming into operation, can appropriately block the transmission of driving force to the first pretensioner. In this way, the seat belt device does not interfere with EA operation.

As described above, the seat belt device according to the invention can be configured as follows: (a) one is to determine in two steps with a common signal (the determination by the first determination unit always comes before that by the second determination unit); (b) another is to configure the second determination unit to forcibly activate the first pretensioner in advance at the time of determining a possible collision regardless of the determination by the first determination unit. The seat belt device described above can eliminate the causes of interference with EA operation for the retractor having a fixed sequence of operation. In addition, the configuration (a) enables the replacement of a conventional retractor having a pyrotechnic pretensioner with that having a motor pretensioner, providing the appropriate operation without a large modification to the control method. This realizes an increase in the ability of restraint of an occupant with relatively low cost. The configuration (b), in which the motor must be driven first, can maintain the operational sequence more reliably.

Since the first pretensioner according to the invention has the limiter, which restricts the transmission of a driving force exceeding the predetermined threshold from the motor to the spindle, it can more reliably eliminate the interference with EA operation.

FIG. 9 is a front view showing the movement of the limiter. In FIG. 9, the gear train is configured such that the seat belt webbing W absorbs the kinetic energy of the occupant moving due to an inertial force at the time of a collision (see FIG. 1). In this way, the seat belt device provides EA operation. In FIG. 9, the tip of the pawl 1p engages with the ratchet gear it, and the occupant moving due to an inertial force unwinds the seat belt webbing W. Accordingly, the spindle 31 rotates, inducing the final gear 1fg to rotate (see FIG. 1 and FIG. 2). The final gear 1fg rotates in a clockwise direction T, inducing the second gear g32 to rotate in a clockwise direction T via the intermediate gear g4.

As described above, in spite of appropriate EA operation, when the automobile experiences a collision without the determination of a possible collision, for example, the transmission of a driving force from the motor M to the spindle 31 via the final gear 1fg interferes with EA operation (see FIG. 3). The seat belt device according to the invention has the first pretensioner 1, including the intermediate gear g3 serving as a limiter. The limiter restricts the transmission of a driving force exceeding a predetermined threshold from the motor M to the spindle 31. The limiter works in such a manner when the motor M rotates in a direction to wind the seat belt webbing W at a driving force exceeding the predetermined threshold, resisting the rotational force of the spindle 31 to unwind the seat belt webbing W. In this way, the seat belt device according to the invention can more securely eliminate the interference with EA operation (see FIG. 1 and FIG. 3).

With reference to FIG. 9, a description is given of the case where the initial gear g1 transmits a driving force to the first gear g31 to rotate in a counterclockwise direction NT via the intermediate gear g2, while resisting the force applied by the final gear 1fg to the second gear g32 in a clockwise direction T via the intermediate gear g4. In such a case, the plurality of elastic members g33 slip over the first gear g31. In this way, the first and second gears g31 and g32 rotate relative to each other, cancelling the unnecessary driving force transmitted from the motor M.

As shown in FIG. 3 and FIG. 8, one intermediate gear of the gear train installed in the first pretensioner is assigned to the limiter. The limiter according to the invention is simply configured with the first and second gears and one or more elastic members. The seat belt device according to the invention can employ a conventional first pretensioner, but does not require any additional mechanisms. In this way, the first pretensioner driven by a motor can be simply configured in terms of assembly, which allows the problems of high cost to be eliminated.

What is claimed is:

1. A seat belt device comprising:
   a first unit for determining a possible collision of an automobile in response to a manipulation thereof by a driver;
   a second unit for detecting the collision of the automobile;
   seat belt webbing;
   a spindle around which a portion of the seat belt webbing is wound;
   a first pretensioner having a motor to rotate in a direction to wind the seat belt webbing onto the spindle in response to a signal indicative of the possible collision determined by the first unit;
   a second pretensioner pyrotechnically driven to rotate in a direction to wind the seat belt webbing onto the spindle in response to a signal indicative of the collision detected by the second unit; and
   a controller configured to cancel an operation of the first pretensioner after an activation of the second pretensioner in a state in which the first pretensioner and the spindle are mechanically connected to each other, wherein
   the first pretensioner includes a limiter for restricting the motor from transmitting a driving force to the spindle exceeding a predetermined threshold, while resisting the spindle rotating in a direction to unwind the seat belt webbing.

2. A seat belt device according to claim 1, wherein the limiter comprises an intermediate gear of a train of gears to transmit a rotation from the motor to the spindle, the intermediate gear including:
   a first gear to which the motor transmits a rotation;
   a second gear coaxially and rotatably coupled with the first gear, transmitting a rotation to the spindle; and
   at least one elastic member for frictionally coupling the first and second gears with a predetermined frictional force.

3. A seat belt device comprising:
   a first unit for determining a possible collision of an automobile in response to a manipulation thereof by a driver;
   a second unit for detecting the collision of the automobile;
   seat belt webbing;
   a spindle around which a portion of the seat belt webbing is wound;
   a first pretensioner having a motor to rotate in a direction to wind the seat belt webbing onto the spindle in response to a signal indicative of the possible collision determined by the first unit;
   a second pretensioner pyrotechnically driven to rotate in a direction to wind the seat belt webbing onto the spindle in response to a signal indicative of the collision detected by the second unit;
   a sensor attached to the automobile; and
   a controller configured to activate the first pretensioner immediately before the second pretensioner starts operating, according to at least one of a signal indicative of an activation of the second unit and a signal generated by the sensor, wherein
   the second pretensioner can release a mechanical connection between the first pretensioner and the spindle only after activation of the first pretensioner, and
   the first pretensioner includes a limiter for restricting the motor from transmitting a driving force to the spindle exceeding a predetermined threshold, while resisting the spindle rotating in a direction to unwind the seat belt webbing.

4. A seat belt device according to claim 3, wherein the limiter comprises an intermediate gear of a train of gears to transmit a rotation from the motor to the spindle, the intermediate gear including:
   a first gear to which the motor transmits a rotation;
   a second gear coaxially and rotatably coupled with the first gear, transmitting a rotation to the spindle; and
   at least one elastic member for frictionally coupling the first and second gears with a predetermined frictional force.

* * * * *